(12) United States Patent
Sakamoto

(10) Patent No.: US 10,457,520 B2
(45) Date of Patent: Oct. 29, 2019

(54) FILM ROLL AND METHOD FOR PRODUCING FILM ROLL

(71) Applicant: Sumitomo Chemical Company, Limited, Chuo-ku, Tokyo (JP)

(72) Inventor: Akinobu Sakamoto, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 311 days.

(21) Appl. No.: 15/413,633

(22) Filed: Jan. 24, 2017

(65) Prior Publication Data

US 2017/0210588 A1     Jul. 27, 2017

(30) Foreign Application Priority Data

Jan. 25, 2016    (JP) ................................ 2016-011696

(51) Int. Cl.
| | |
|---|---|
| *B65H 75/10* | (2006.01) |
| *B65H 75/18* | (2006.01) |
| *H01M 2/14* | (2006.01) |
| *H01M 2/16* | (2006.01) |
| *H01M 10/0525* | (2010.01) |

(52) U.S. Cl.
CPC ............ *B65H 75/10* (2013.01); *B65H 75/18* (2013.01); *H01M 2/145* (2013.01); *B65H 2701/5122* (2013.01); *H01M 2/1653* (2013.01); *H01M 10/0525* (2013.01)

(58) Field of Classification Search
CPC . B65H 75/10; B65H 75/18; B65H 2701/5122
See application file for complete search history.

(56) References Cited

U.S. PATENT DOCUMENTS

| | | | |
|---|---|---|---|
| 4,989,802 | A | 2/1991 | Akao et al. |
| 2014/0001298 | A1 | 1/2014 | Noumi et al. |

FOREIGN PATENT DOCUMENTS

| | | |
|---|---|---|
| CN | 103213880 A | 7/2013 |
| CN | 103415457 A | 11/2013 |
| JP | S61128256 | 8/1986 |
| JP | 2-37799 | 2/1990 |
| JP | 2-37799 | 10/1990 |
| JP | 6-37255 | 5/1994 |
| JP | H09-050096 A | 2/1997 |
| JP | 3172995 U | 1/2012 |
| JP | 3173556 U | 2/2012 |

(Continued)

OTHER PUBLICATIONS

Office Action dated Jul. 3, 2018 in JP Application No. 2017011062 (Partial English Translation).

(Continued)

*Primary Examiner* — William E Dondero
(74) *Attorney, Agent, or Firm* — Panitch Schwarze Belisario & Nadel LLP

(57) ABSTRACT

In order to provide a film roll that includes a core having improved rigidity without increasing a cost, the present invention provides a film roll including: a cylindrical core; and a film wound around an outer peripheral surface of the core, the core satisfying the following inequality: $D \times 0.0017 + 0.50 < T1/T2 < D \times 0.0017 + 0.95$, wherein D (mm) denotes a difference between an outer diameter of the core and an inner diameter of the core, T1 (mm) denotes a thickness of an outer peripheral part, and T2 (mm) denotes a thickness of an inner peripheral part.

8 Claims, 13 Drawing Sheets

(56) References Cited

FOREIGN PATENT DOCUMENTS

| | | |
|---|---|---|
| JP | 2012201797 A | 10/2012 |
| JP | 2013023290 A | 2/2013 |
| JP | 2013023291 A | 2/2013 |
| JP | 2013052967 A | 3/2013 |
| JP | 2015074512 A | 4/2015 |
| JP | 2015074513 A | 4/2015 |
| JP | 2015120595 A | 7/2015 |
| JP | 3201628 U | 12/2015 |
| KR | 20090034910 A | 4/2009 |
| KR | 20130085341 A | 7/2013 |

OTHER PUBLICATIONS

Office Action dated Mar. 7, 2017 in JP Application No. 2014-543372.
Office Action dated Feb. 13, 2018 in JP Application No. 2017-011062 (Partial English Translation).
Office Action dated Sep. 26, 2017 in JP Application No. 2017-011062.
Office Action dated Dec. 4, 2018 in JP Application No. 2017-011062 (Partial English Translation).

(a)

(b)

FILM ROLL AND METHOD FOR PRODUCING FILM ROLL

This Nonprovisional application claims priority under 35 U.S.C. § 119 on Patent Application No. 2016-011696 filed in Japan on Jan. 25, 2016, the entire contents of which are hereby incorporated by reference.

TECHNICAL FIELD

The present invention relates to a film roll and a method for producing a film roll.

BACKGROUND ART

A lithium-ion secondary battery includes a cathode, an anode, a porous separator which separates the cathode and the anode. In a process for producing a lithium-ion secondary battery, a separator roll, which is a roll of a separator wound on a cylindrical core, is used. The core is required to have a certain degree of rigidity in order to prevent the core from being deformed by a stress caused by winding the separator on the core.

As a core for winding a film such as a battery separator thereon is known a core having a double cylinder structure in which there are provided a ring-shaped outer peripheral part including an outer peripheral surface around which a film is wound, a ring-shaped inner peripheral part for fitting a take-up roller to an inner peripheral surface of the inner peripheral part, and a plurality of ribs that support the outer peripheral part from the inner peripheral surface, the ribs extending between the outer peripheral part and the inner peripheral part.

Patent Literature 1 discloses a film take-up reel as a core having such a structure. The film take-up reel disclosed in Patent Literature 1 includes an outer wheel (outer peripheral part) having a thickness of 6.15 mm, an inner wheel (inner peripheral part) having a thickness of 5.05 mm, and spoke plates (ribs) each having a thickness of 5 mm, and further includes a reinforcing part protrude through an inner peripheral surface of the outer wheel toward a shaft center. This makes it possible to improve rigidity of the film take-up reel, thus preventing the film take-up reel from being deformed by a stress caused by winding of a film.

CITATION LIST

Patent Literature

[Patent Literature 1]
Publication of Japanese Registered Utility Model No. 3172995 (publication date: Jan. 19, 2012)

SUMMARY OF INVENTION

Technical Problem

The film take-up reel disclosed in Patent Literature 1 requires the reinforcing part in order to improve rigidity of the film take-up reel. This unfortunately leads to a greater production cost than those of the conventional cores. This results in increased production cost of a roll.

The present invention has been made in view of the above problem, and it is an object of the present invention to provide (i) a film roll that includes a core having improved rigidity without increasing a weight and cost of the core and (ii) a method for producing the film roll.

Solution to Problem

In order to solve the above problem, a film roll of the present invention is a film roll including: a cylindrical core; and a film wound around an outer peripheral surface of the core, the core including: a ring-shaped outer peripheral part defining an outer diameter of the core; a ring-shaped inner peripheral part, provided inside the outer peripheral part, defining an inner diameter of the core; and a plurality of ribs which extend between the outer peripheral part and the inner peripheral part in a direction of a radius of the core so as to connect the outer peripheral part and the inner peripheral part, the core satisfying the following inequality: $D \times 0.0017 + 0.50 < T1/T2 < D \times 0.0017 + 0.95$, wherein D (mm) denotes a difference between the outer diameter of the core and the inner diameter of the core, T1 (mm) denotes a thickness of the outer peripheral part, and T2 (mm) denotes a thickness of the inner peripheral part.

The above arrangement enables a thickness ratio of the outer peripheral part and the inner peripheral part to take a preferable value for increasing rigidity of the core. This makes it possible to provide a film roll that includes a core having improved rigidity without increasing a weight and cost of the core.

In order to solve the above problem, a method, of the present invention, for producing a film roll is a method for producing a film roll, the film roll including: a cylindrical core; and a film wound around an outer peripheral surface of the core, the method including the step of: winding the film around the outer peripheral surface of the core, the core including: a ring-shaped outer peripheral part defining an outer diameter of the core; a ring-shaped inner peripheral part, provided inside the outer peripheral part, defining an inner diameter of the core; and a plurality of ribs which extend between the outer peripheral part and the inner peripheral part in a direction of a radius of the core so as to connect the outer peripheral part and the inner peripheral part, the core satisfying the following inequality: $D \times 0.0017 + 0.50 < T1/T2 < D \times 0.0017 + 0.95$, wherein D (mm) denotes a difference between the outer diameter of the core and the inner diameter of the core, T1 (mm) denotes a thickness of the outer peripheral part, and T2 (mm) denotes a thickness of the inner peripheral part.

The above production method enables a thickness ratio of the outer peripheral part and the inner peripheral part to take a preferable value for increasing rigidity of the core. This makes it possible to produce a film roll that includes a core having improved rigidity without increasing a weight and cost of the core.

Advantageous Effects of Invention

According to the present invention, it is possible to provide (i) a film roll that includes a core having improved rigidity without increasing a weight and cost of the core and (ii) a method for producing the film roll.

DESCRIPTION OF EMBODIMENTS

The following description will discuss details of an embodiment of the present invention with reference to FIGS. 1 to 10. The following description will discuss, as a film roll in accordance with an embodiment of the present invention, a heat-resistant separator roll including a wound heat-resistant separator for a battery such as a lithium-ion secondary battery.

Embodiment 1

<Lithium-Ion Secondary Battery>

A nonaqueous electrolyte secondary battery, typically, a lithium-ion secondary battery has a high energy density, and therefore, is currently widely used not only as batteries for use in devices such as personal computers, mobile phones, and mobile information terminals, and for use in moving bodies such as automobiles and airplanes, but also as stationary batteries contributing to stable power supply.

Figure 1:
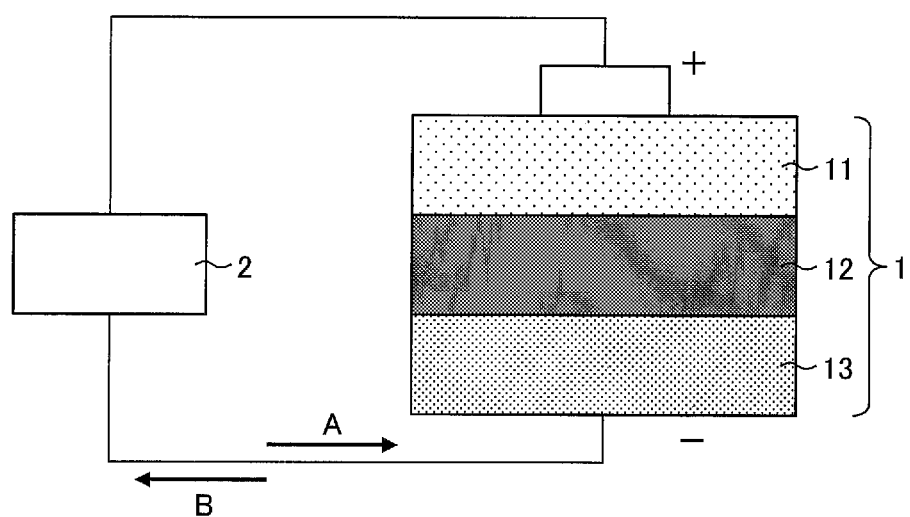
FIG. 1 is a view schematically illustrating a cross sectional configuration of a lithium-ion secondary battery 1.

FIG. 1 is a view schematically illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

<Separator>

The separator 12 is provided so as to be sandwiched between the cathode 11 which is a positive electrode of the lithium-ion secondary battery 1 and the anode 13 which is a negative electrode of the lithium-ion secondary battery 1. The separator 12 separates the cathode 11 and the anode 13, allowing lithium ions to move between the cathode 11 and the anode 13. For example, polyolefin such as polyethylene or polypropylene is used as a material of the separator 12.

Figure 2:
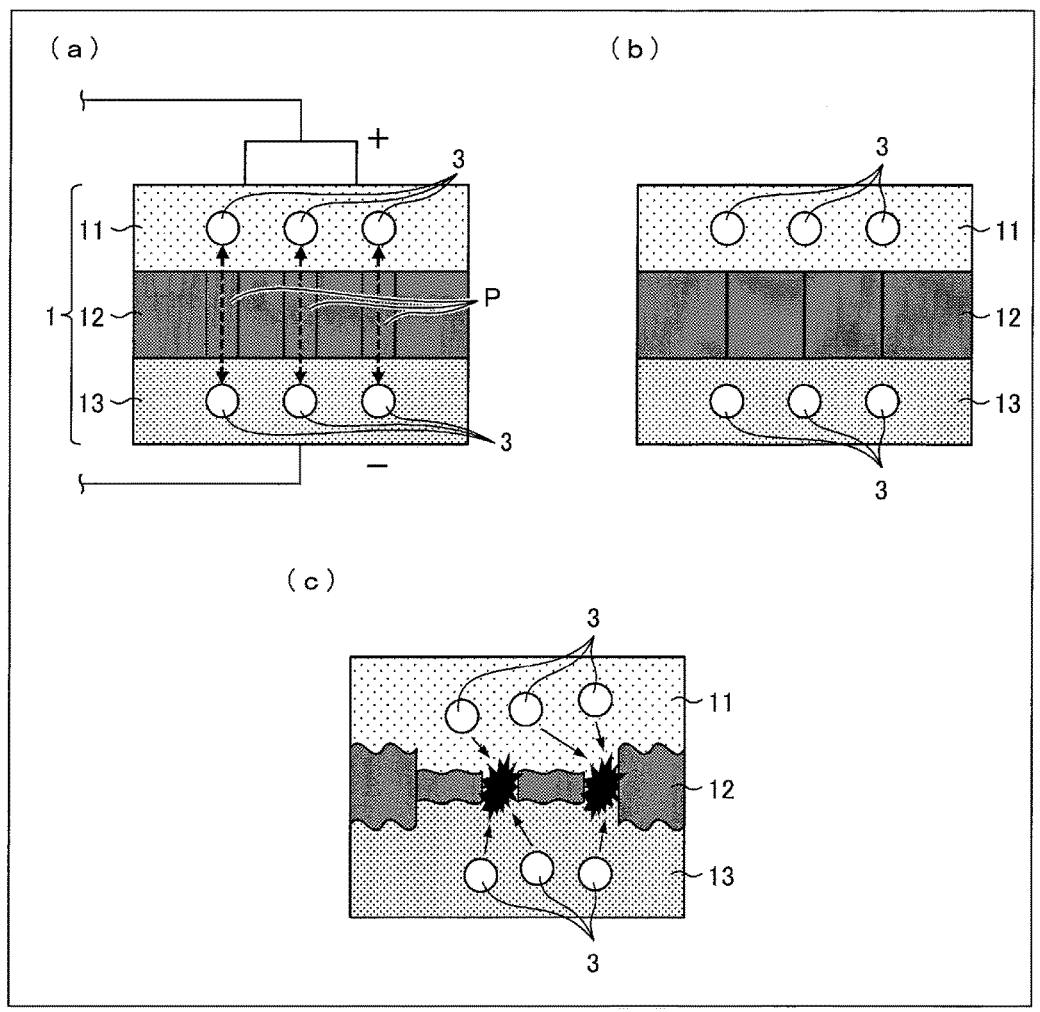
FIG. 2 is a view schematically illustrating states of the lithium-ion secondary battery 1 illustrated in FIG. 1.

FIG. 2 schematically illustrates states of the lithium-ion secondary battery 1 illustrated in FIG. 1. (a) of FIG. 2 illustrates a normal state of the lithium-ion secondary battery 1. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of an external device, or the like. In such cases, the separator 12 melts or softens and the pores P are blocked as illustrated in (b) of FIG. 2. As a result, the separator 12 shrinks. This stops the back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving back and forth. Consequently, the temperature continues rising.

<Heat-Resistant Separator>

Figure 3:
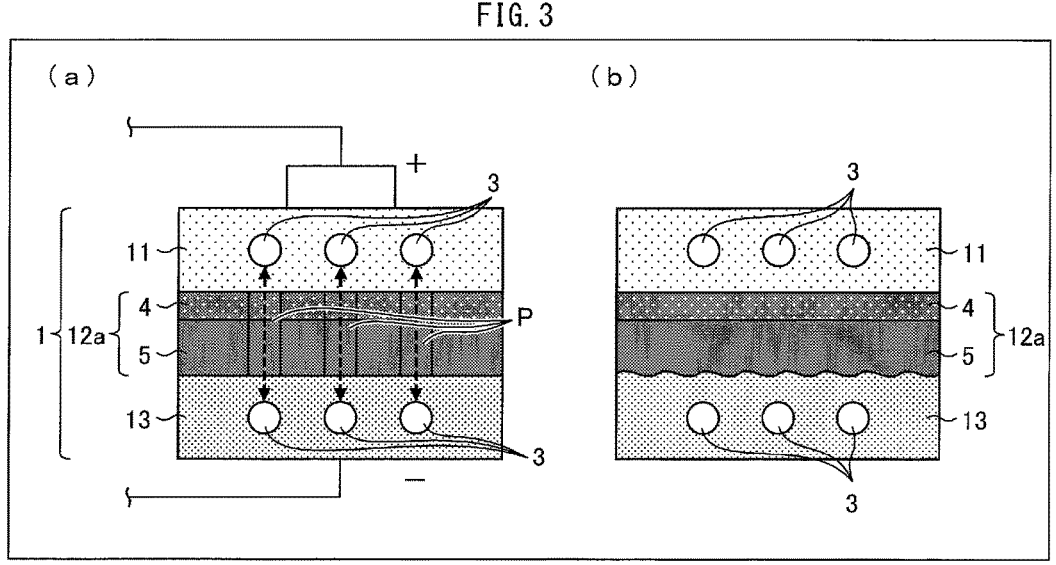
FIG. 3 is a view schematically illustrating states of the lithium-ion secondary battery 1 having another configuration.

FIG. 3 schematically illustrates states of the lithium-ion secondary battery 1 having another configuration. (a) of FIG. 3 illustrates a normal state of the lithium-ion secondary battery 1, and (b) of FIG. 3 illustrates a state in which a temperature of the lithium-ion secondary battery 1 has sharply risen.

As illustrated in (a) of FIG. 3, the lithium-ion secondary battery 1 can further include a heat-resistant layer 4. The heat-resistant layer 4 can be provided to the separator 12. (a) of FIG. 3 illustrates a configuration in which the separator 12 is provided with the heat-resistant layer 4 serving as a functional layer. A film in which the separator 12 is provided with the heat-resistant layer 4 is hereinafter referred to as a heat-resistant separator 12a (functional film).

In the configuration illustrated in (a) of FIG. 3, the heat-resistant layer 4 is laminated on a surface of the separator 12 which surface is on a cathode 11 side. Note that the heat-resistant layer 4 can alternatively be laminated on a surface of the separator 12 which surface is on an anode 13 side, or both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops the back-and-forth movement of the lithium ions 3 and consequently stops the above-described excessive discharging or excessive charging. In this way, the separator 12 can be prevented from being destroyed.

<Process for Producing Heat-Resistant Separator>

For example, a process for producing a heat-resistant separator which includes a heat-resistant layer made of aramid resin includes, in the following order, a step of unwinding and checking a porous film, a step of applying coating of a coating material (functional material), a step of cleaning, a step of drying, a step of inspecting a coated article, and a step of winding.

Further, a process for producing a heat-resistant separator which includes a heat-resistant layer containing an inorganic filler as a main component includes, in the following order, a step of unwinding and checking a porous film, a step of applying coating of a coating material (functional material), a step of drying, a step of inspecting a coated article, and a step of winding.

In the step of winding, a heat-resistant separator having undergone inspection is slit so as to have a narrow width such as a product width, if necessary. Thereafter, the heat-resistant separator thus slit is wound on a cylindrical core.

Figure 4:
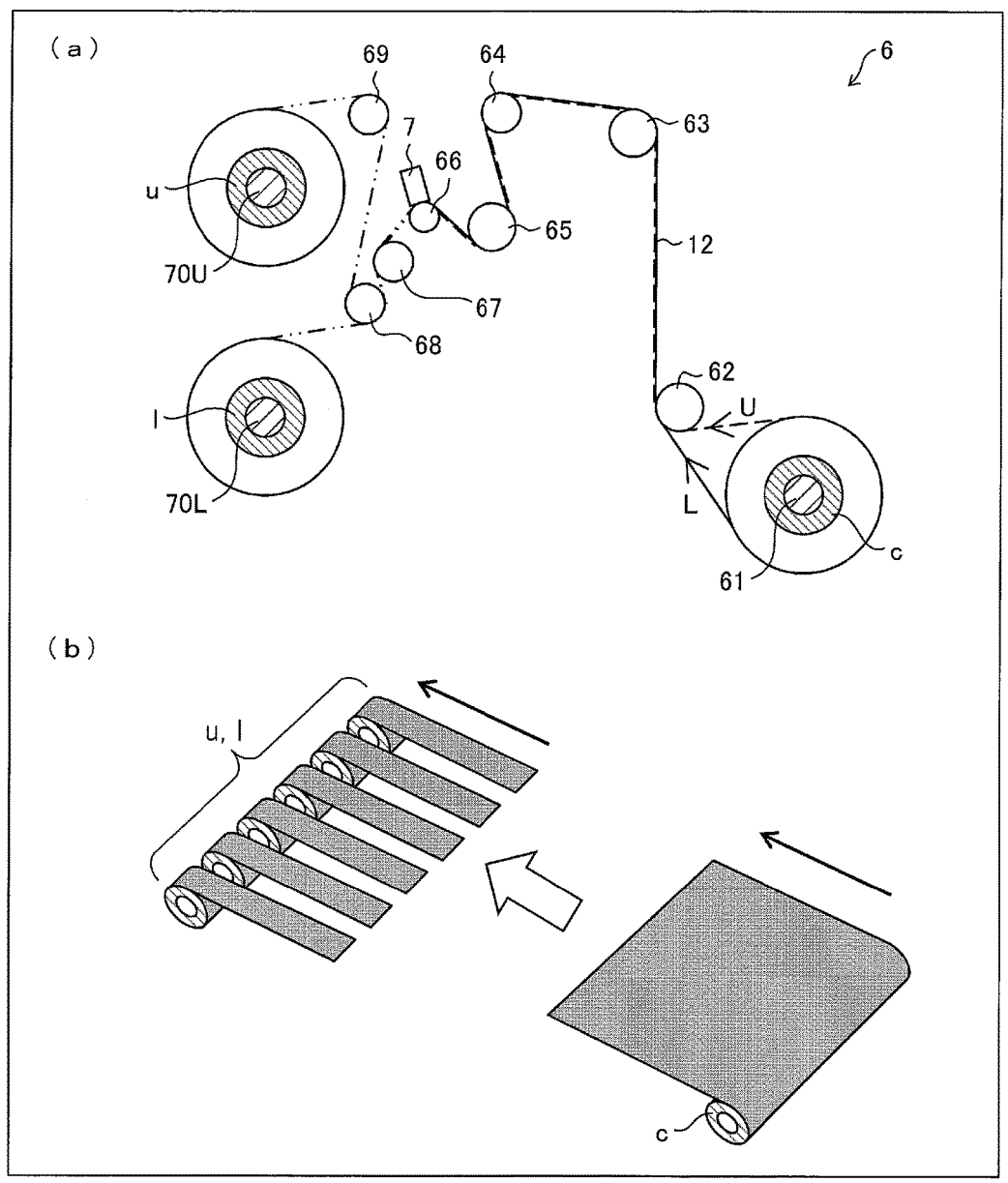
FIG. 4 is a view schematically illustrating a configuration of a slitting apparatus 6 for slitting a separator, wherein (a) of FIG. 4 illustrates an overall view of a configuration of the slitting apparatus 6, and (b) of FIG. 4 illustrates configurations before and after slitting an original sheet.

FIG. 4 is a view schematically illustrating a configuration of a slitting apparatus 6 for slitting the separator. (a) of FIG. 4 illustrates an overall view of a configuration of the slitting apparatus 6, and (b) of FIG. 4 illustrates configurations before and after slitting an original sheet.

As illustrated in (a) of FIG. 4, the slitting apparatus 6 includes a cylindrical wind-off roller 61 that is supported such that it can rotate, rollers 62 to 69, and take-up rollers 70U and 70L. The slitting apparatus 6 is further provided with a cutting device 7 described later.

(Before Slitting)

In the slitting apparatus 6, a cylindrical core c around which the original sheet is wound is fit on the wind-off roller 61. As illustrated in (b) of FIG. 4, the original sheet is wound off from the core c to route U or route L. The original sheet thus wound off is transferred to the roller 68 via the rollers 63 to 67. During the step of transferring the unwound original sheet, the original sheet is slit into a plurality of slit separators.

(After Slitting)

As illustrated in (b) of FIG. 4, some of the slit separators are each wound around cylindrical cores u (bobbins) fit on the take-up roller 70U. Meanwhile, the other slit separators are each wound around cylindrical cores 1 (bobbins) fit on the take-up roller 70L. Note that a combination of each of the cores and each of the heat-resistant separators wound into a roll form around outer peripheral surfaces of the cores is referred to as a "heat-resistant separator roll (film roll)".

<Heat-Resistant Separator Roll>

Figure 5:
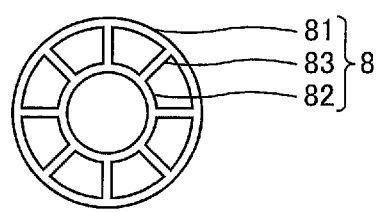
FIG. 5 is a view schematically illustrating a configuration of a heat-resistant separator roll in accordance with Embodiment 1, wherein (a) of FIG. 5 illustrates a core, and (b) of FIG. 5 illustrates a heat-resistant separator roll that includes the core and a heat-resistant separator wound on the core.
Figure 5:
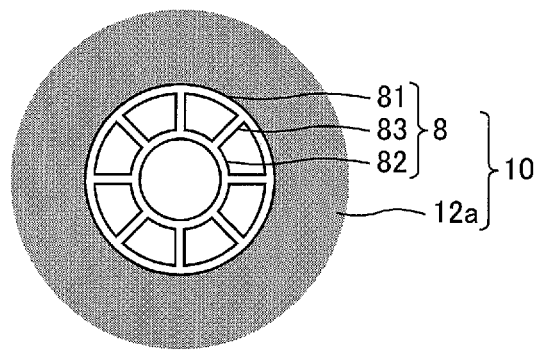

FIG. 5 is a view schematically illustrating a configuration of a heat-resistant separator roll in accordance with an embodiment of the present invention. (a) of FIG. 5 illustrates a core, and (b) of FIG. 5 illustrates a heat-resistant separator roll that includes the core and a heat-resistant separator wound on the core.

As illustrated in (a) of FIG. 5, a core 8 has a generally cylindrical shape. The core 8 includes: a ring-shaped outer peripheral part 81 that forms the outer peripheral surface around which the heat-resistant separator 12a is wound; a ring-shaped inner peripheral part 82, provided inside the outer peripheral part 81, for fitting a take-up roller to an inner peripheral surface of the inner peripheral part 82; and a plurality of ribs 83 which extend between the outer peripheral part 81 and the inner peripheral part 82 in a direction of a radius of the core 8 so as to connect the outer peripheral part 81 and the inner peripheral part 82. The outer peripheral part 81 defines an outer diameter of the core 8, while the inner peripheral part 82 defines an inner diameter of the core 8. A core used as the core 8 can have an inner diameter of 3 inches and an outer diameter of not less than 6 inches and not more than 12 inches. Alternatively, the core 8 may have an inner diameter of 3 inches or more. For example, in a case where the core 8 has an outer diameter of 8 inches or more, the core 8 may have an inner diameter of 3 inches to 6 inches.

A typical core, as illustrated in (a) of FIG. 5, includes eight ribs 83 that are radially provided at equal intervals along a circumference of the core 8 around a shaft center of the core 8. However, the core 8 used in a heat-resistant separator roll 10 in accordance with an embodiment of the present invention may be a core 8 that includes seven or less ribs 83 or may be a core 8 that includes nine or more ribs 83.

A material for the core 8 includes ABS resin. However, the material for the core 8 in accordance with an embodiment of the present invention is not limited to the above. The material for the core 8 may include resins other than ABS resin, such as polyethylene resin, polypropylene resin, polystyrene resin, and vinyl chloride resin.

In a case where the core 8 is produced by resin molding, thicknesses of the outer peripheral surface and the inner peripheral surface can be inclined in a width direction of the core 8 in order to allow the core 8 to be easily removed from a mold. In the core 8 arranged in such a manner, an average value of outer diameters in the width direction of the core 8 serves as the outer diameter of the core 8, while an average value of inner diameters in the width direction of the core 8 serves as the inner diameter of the core 8.

<Rigidity of Core>

As illustrated in (b) of FIG. 5, the heat-resistant separator roll 10, in which the heat-resistant separator 12a is wound on the core 8, is such that a stress caused by winding of the heat-resistant separator 12a is applied to the core 8. In order to prevent the core 8 from being deformed by the stress caused by winding of the heat-resistant separator 12a, it is required that the core 8 have rigidity equal to or higher than a certain level of rigidity.

One approach for improving rigidity of the core 8 is considered to be increases in thicknesses (wall thicknesses) of the outer peripheral part 81, the inner peripheral part 82, and the ribs 83. Unfortunately, this approach increases a weight of the whole core 8, which consequently leads to an increase in production cost.

In view of this, it is preferable that the core 8 be so designed that individual parts of the core 8 have optimum dimensions so that an increase in rigidity of the core 8 is achieved without increasing the weight of the whole core 8. Optimum dimensions of the core 8 can be obtained by, for example, the following method. According to the method, rigidity of the core 8 is determined through a simulation performed with varying dimensions of the core 8 under conditions where the core 8 has a constant weight, and dimensions which allow rigidity of the core 8 to reach a maximum are selected from among the varying dimensions.

<Method for Producing Core and Heat-Resistant Separator Roll>

The following description will discuss computational conditions used to simulate rigidity of a core. Note that the computational conditions discussed below are only an example. Alternatively, rigidity of the core may be determined through a simulation under other computational conditions or may be determined by an experiment without performing a simulation.

Figure 6:
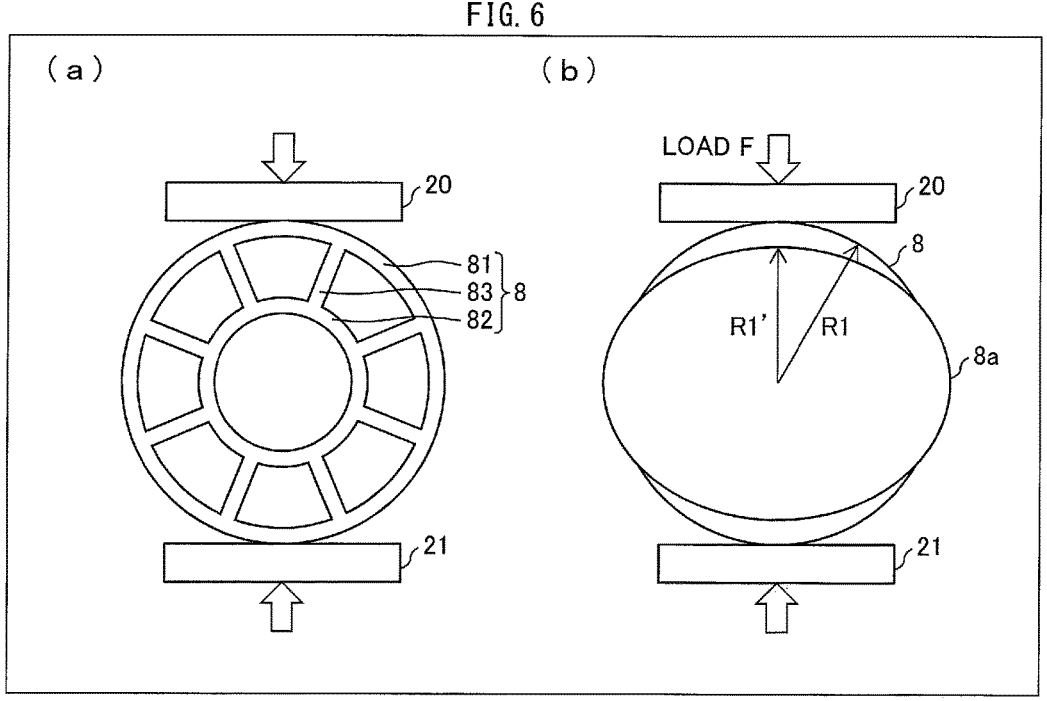
FIG. 6 is a view illustrating a manner in which rigidity of a core is determined, wherein (a) of FIG. 6 illustrates a state of the core before a load is applied to the core, and (b) of FIG. 6 illustrates a state of the core under a load.

FIG. 6 is a view illustrating a manner in which rigidity of a core is determined. (a) of FIG. 6 illustrates a state of the core before a load is applied to the core, and (b) of FIG. 6 illustrates a state of the core under a load. For convenience of explanation, (b) of FIG. 6 provides illustration of an outer periphery of the core, but omits illustration of individual parts of the core.

As illustrated in (a) of FIG. 6, the core 8 is sandwiched between two flat plates 20 and 21 that are provided oppositely to each other, and a load F is then applied to the core 8 via the flat plates 20 and 21. In so doing, the core 8 is sandwiched between the flat plates 20 and 21 so that an imaginary line, which connects a point of contact between the flat plate 20 and the core 8 and a point of contact between the flat plate 21 and the core 8, passes through a point provided at a distance equally from two ribs 83, which are provided adjacent to each other with the imaginary line therebetween. The length of each of parts where the core 8 contacts the flat plates 20 and 21 is 5 mm along the perimeter of the core 8.

As illustrated in (b) of FIG. 6, assume that R1 (mm) is a radius of the outer periphery of the core 8 before the load F is applied to the core 8, and R1' (mm) is a radius of an outer periphery of a core 8a deformed under the load F (N per mm of core width). In this case, a radial distortion ε of the core is expressed by the following expression:

$$\varepsilon = (R1 - R1')/R1.$$

Further, rigidity Ec of the core 8 is expressed by Ec=F/ε.

Figure 7:
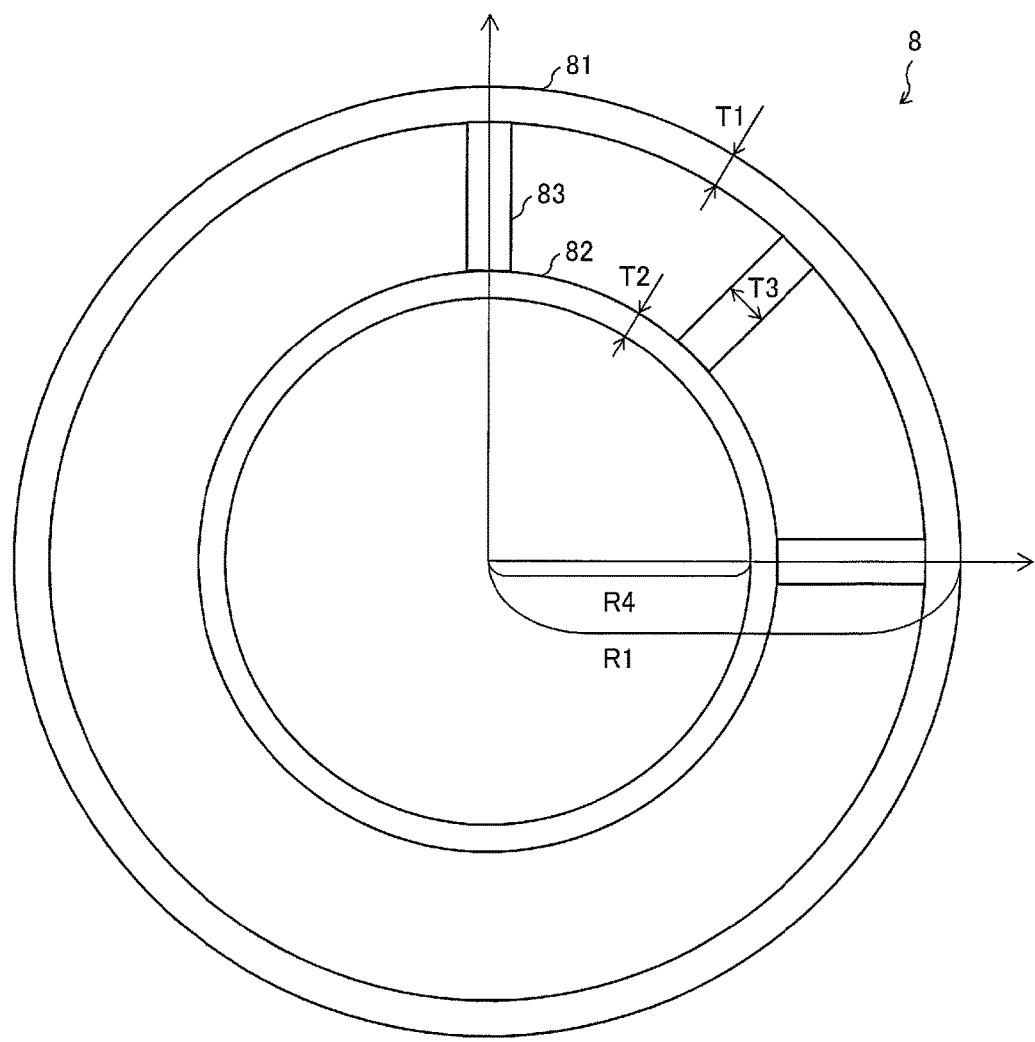
FIG. 7 is a view schematically illustrating dimensions of individual parts of a core.

FIG. 7 is a view schematically illustrating dimensions of individual parts of a core.

The core 8 in the present embodiment was so designed that a radius R4 of an inner periphery of the core 8 is 37.5 mm (the core 8 has an inner diameter of approximately 3 inches). The rigidity of the core 8 including 8 ribs was determined through a simulation performed with varying radius R1 of the outer periphery of the core 8, varying wall thickness of the outer peripheral part 81, and varying wall thickness of the inner peripheral part 82.

<Relationship Between Wall Thickness and Rigidity>

Figure 8:
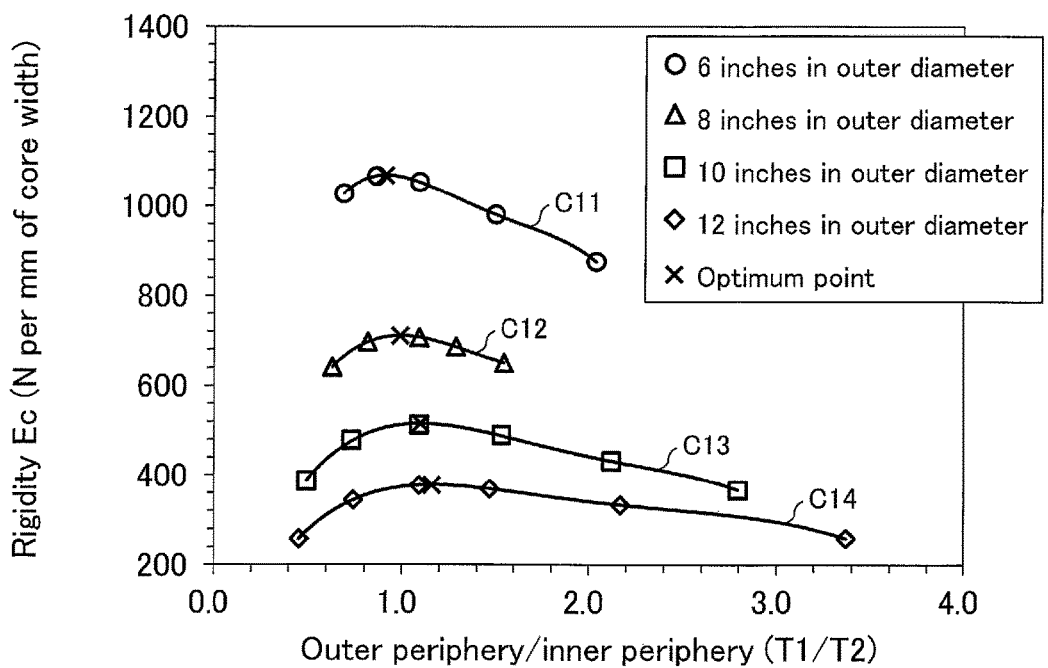
FIG. 8 is a graph showing a relationship between a wall thickness ratio between an outer peripheral part of a core including 8 ribs and an inner peripheral part of the core and rigidity of the core.

FIG. 8 is a graph showing a relationship between a wall thickness ratio between an outer peripheral part of a core and an inner peripheral part of the core and rigidity of the core. In the graph in FIG. 8, a horizontal axis represents a ratio (T1/T2) between a wall thickness T1 (mm) of the outer peripheral part 81 and a wall thickness T2 (mm) of the inner peripheral part 82, and a vertical axis represents rigidity of the core 8.

On the graph in FIG. 8, rigidity of a core 8 having an outer diameter of 6 inches (outer periphery having a radius R1 of 76 mm), rigidity of a core 8 having an outer diameter of 8 inches (outer periphery having a radius R1 of 101.6 mm), rigidity of a core 8 having an outer diameter of 10 inches (outer periphery having a radius R1 of 127 mm), and rigidity of a core 8 having an outer diameter of 12 inches (outer periphery having a radius R1 of 152.4 mm) are plotted.

In the core 8 having an outer diameter of 6 inches, a difference between the outer diameter (152 mm) and the inner diameter (75 mm) is 77 mm. In the core 8 having an outer diameter of 8 inches, a difference between the outer diameter (203.2 mm) and the inner diameter (75 mm) is 128.2 mm. In the core 8 having an outer diameter of 10 inches, a difference between the outer diameter (254 mm) and the inner diameter (75 mm) is 179 mm. In the core 8 having an outer diameter of 12 inches, a difference between the outer diameter (304.8 mm) and the inner diameter (75 mm) is 229.8 mm.

A curve C11 is an approximation curve that indicates how rigidity of the core 8 having an outer diameter of 6 inches varies with varying wall thickness ratio (T1/T2) under conditions where the core 8 has a constant weight. A curve C12 is an approximation curve that indicates how rigidity of the core 8 having an outer diameter of 8 inches varies with varying wall thickness ratio (T1/T2) under conditions where the core 8 has a constant weight. A curve C13 is an approximation curve that indicates how rigidity of the core 8 having an outer diameter of 10 inches varies with varying wall thickness ratio (T1/T2) under conditions where the core 8 has a constant weight. A curve C14 is an approximation curve that indicates how rigidity of the core 8 having an outer diameter of 12 inches varies with varying wall thickness ratio (T1/T2) under conditions where the core 8 has a constant weight.

Further, a sign X on the curves C11 to C14 indicates a maximum point on each of the curves CI to C14. The maximum point indicates (i) an optimum wall thickness ratio that maximizes rigidity of the core 8 under conditions where the core 8 has a constant weight and (ii) rigidity obtained at that optimum wall thickness ratio.

Figure 9:
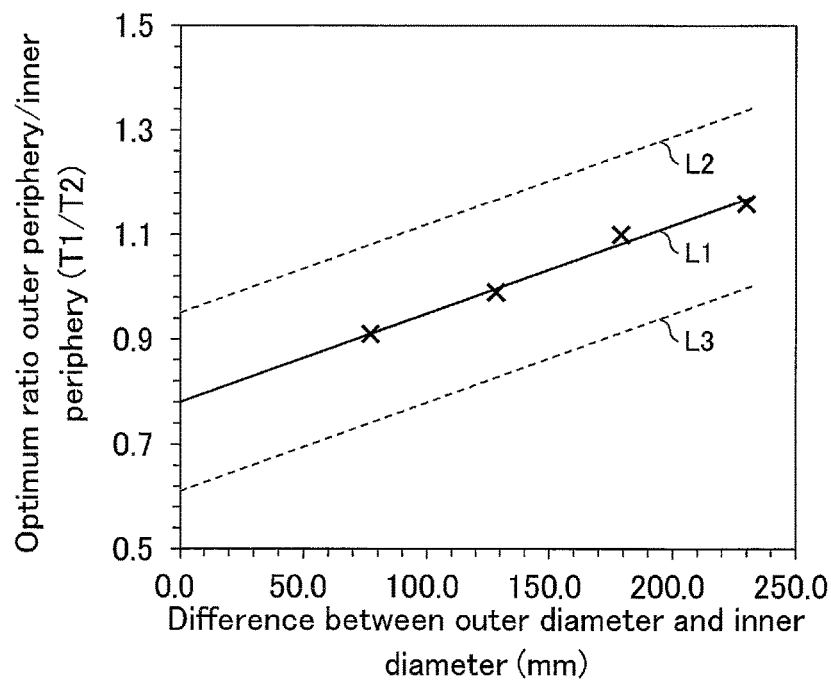
FIG. 9 is a graph showing a relationship between a difference between an outer diameter of a core including 8 ribs and an inner diameter of the core and an optimum wall thickness ratio which allows rigidity of the core to reach a maximum.

FIG. 9 is a graph showing a relationship between a difference between an outer diameter of a core and an inner diameter of the core and an optimum wall thickness ratio which allows rigidity of the core to reach a maximum. In FIG. 9, a horizontal axis represents a difference between the outer diameter of the core 8 and the inner diameter of the core 8, and a vertical axis represents a wall thickness ratio (T1/T2) between the outer peripheral part 81 of the core 8 and the inner peripheral part 82 of the core 8.

In the graph in FIG. 9, signs X are plotted to indicate optimum wall thickness ratios (T1'/T2') at which rigidity of the cores 8 having outer diameters of 6 inches, 8 inches, 10 inches, and 12 inches reach a maximum.

As shown in the graph in FIG. 9, the optimum wall thickness ratio (T1'/T2') at which rigidity of the core 8 reach a maximum is proportional to a difference D between the outer diameter of the core 8 and the inner diameter of the core 8. An approximation line L1 of the optimum wall thickness ratio (T1'/T2') can be expressed by the following equation:

(T1'/T2')=0.0017D+0.78           Equation (1).

In order to improve rigidity of the core 8 under conditions where the core 8 has a constant weight, it is preferable that the wall thickness ratio (T1/T2) between the outer peripheral part 81 and the inner peripheral part 82 be determined based on the Equation (1) according to the difference D between the outer diameter of the core 8 and the inner diameter of the core 8.

Note that a value of the wall thickness ratio (T1/T2) of the core 8 may be set to a value that falls within a range having a given width which extends in positive and negative directions with respect to the optimum wall thickness ratio (T1'/T2'). For example, the wall thickness ratio (T1/T2) may be set to a value that falls within a range of A±0.15, wherein A is the optimum wall thickness ratio (T1'/T2').

In the graph in FIG. 9, a line L2 is a line that connects points obtained by incrementing the points on the approximation line L1 by 0.15, and a line L3 is a line that connects points obtained by decrementing the points on the approximation line L1 by 0.15. It is preferable that dimensions of the core 8 be determined so that a value of the wall thickness ratio (T1/T2) falls within a range extending from the line L2 to the line L3.

That is, assuming that a difference between the outer diameter and the inner diameter is denoted as D (mm), it is preferable that the difference D between the outer diameter and the inner diameter and the wall thickness ratio (T1/T2) between the outer peripheral part 81 and the inner peripheral part 82 be so designed as to satisfy the following inequality:

D×0.0017+0.63<T1/T2<D×0.0017+0.93.

This makes it possible to improve rigidity of the core 8, without increasing the weight of the core 8.

Although the above description assumes that a preferable range of values of the wall thickness ratio (T1/T2) is the optimum wall thickness ratio A±0.15, the range of values of the wall thickness ratio (T1/T2) for improving rigidity of the core 8 is not limited to such a range.

Alternatively, the range of values which the wall thickness ratio (T1/T2) takes may be the optimum wall thickness ratio A±0.1 or may be the optimum wall thickness ratio A±0.05. Further, the range of values which the wall thickness ratio (T1/T2) takes is not limited to the range having a given width with respect to the optimum wall thickness ratio A, and may be a range corresponding to not less than 85% and not more than 115% of a value of the optimum wall thickness ratio A.

Embodiment 2

Figure 10:
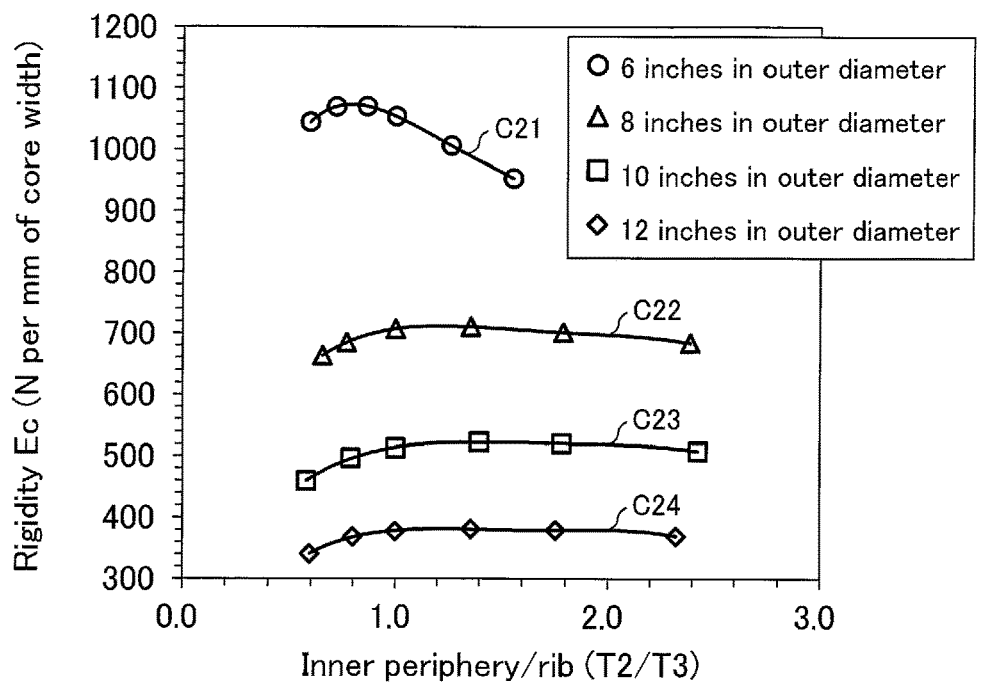
FIG. 10 is a graph showing a relationship between a wall thickness ratio between an inner peripheral part of a core including 8 ribs and a corresponding one of ribs of the core and rigidity of the core.

The following description will discuss another embodiment of the present invention with reference to FIG. 10. Note that, for convenience of description, any member having a function identical to that of a member discussed in the foregoing embodiment will be given an identical reference sign, and a description thereof will be omitted.

FIG. 10 is a graph showing a relationship between a wall thickness ratio between an inner peripheral part of a core and a corresponding one of ribs of the core and rigidity of the core. In the graph in FIG. 10, a horizontal axis represents a ratio (T2/T3) between a wall thickness T2 (mm) of the inner peripheral part 82 and a wall thickness T3 (mm) of a corresponding one of ribs 83, and a vertical axis represents rigidity of the core 8.

On the graph in FIG. 10, rigidity of a core 8 having an outer diameter of 6 inches (outer periphery having a radius R1 of 76 mm), rigidity of a core 8 having an outer diameter of 8 inches (outer periphery having a radius R1 of 101.6 mm), rigidity of a core 8 having an outer diameter of 10 inches (outer periphery having a radius R1 of 127 mm), and rigidity of a core 8 having an outer diameter of 12 inches (outer periphery having a radius R1 of 152.4 mm) are plotted.

A curve C21 is an approximation curve that indicates how rigidity of the core 8 having an outer diameter of 6 inches varies with varying wall thickness ratio (T2/T3) under conditions where the core 8 has a constant weight. A curve C22 is an approximation curve that indicates how rigidity of the core 8 having an outer diameter of 8 inches varies with varying wall thickness ratio (T2/T3) under conditions where the core 8 has a constant weight. A curve C23 is an approximation curve that indicates how rigidity of the core 8 having an outer diameter of 10 inches varies with varying wall thickness ratio (T2/T3) under conditions where the core 8 has a constant weight. A curve C24 is an approximation curve that indicates how rigidity of the core 8 having an outer diameter of 12 inches varies with varying wall thickness ratio (T2/T3) under conditions where the core 8 has a constant weight.

As illustrated in FIG. 10, for all of the curves C21 to C24, the wall thickness ratio (T2/T3) between the inner peripheral part 82 and a corresponding one of the ribs 83 at a maximum point of rigidity of the core 8 is not less than 0.5 and not more than 2.3 (0.5≤T2/T3≤2.3). That is, in order to improve rigidity of the core 8 under conditions where the core 8 has a constant weight, it is preferable that the wall thickness ratio (T2/T3) between the inner peripheral part 82 and a corresponding one of the ribs 83 be not less than 0.5 and not more than 2.3.

More specifically, in a case where the core 8 has an outer diameter of 6 inches (having the outer diameter different from the inner diameter by 77 mm), it is preferable that the wall thickness ratio (T2/T3) be not less than 0.5 and not more than 1.1. Further, in a case where the core 8 has an outer diameter of 8 inches to 12 inches (having the outer diameter different from the inner diameter by not less than 128.2 mm and not more than 229.8 mm), it is preferable that the wall thickness ratio (T2/T3) be not less than 0.8 and not more than 2.3.

This makes it possible to improve rigidity of the core 8, without increasing the weight of the core 8.

Embodiment 31

Figure 11:
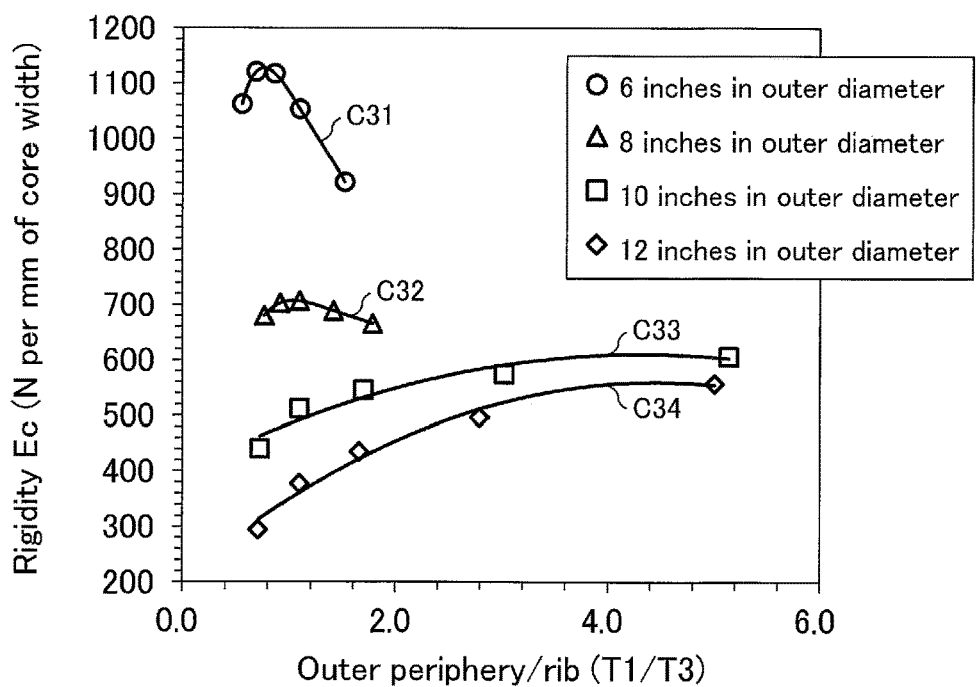
FIG. 11 is a graph showing a relationship between a wall thickness ratio between an outer peripheral part of a core including 8 ribs and a corresponding one of ribs of the core and rigidity of the core.

The following description will discuss still another embodiment of the present invention with reference to FIG. 11. Note that, for convenience of description, any member having a function identical to that of a member discussed in the foregoing embodiment will be given an identical reference sign, and a description thereof will be omitted.

FIG. 11 is a graph showing a relationship between a wall thickness ratio between an outer peripheral part of a core and a corresponding one of ribs of the core and rigidity of the core. In the graph in FIG. 11, a horizontal axis represents a ratio (T1/T3) between a wall thickness T1 (mm) of the outer peripheral part 81 and a wall thickness T3 (mm) of a corresponding one of ribs 83, and a vertical axis represents rigidity of the core 8.

On the graph in FIG. 11, rigidity of a core 8 having an outer diameter of 6 inches (outer periphery having a radius R1 of 76 mm), rigidity of a core 8 having an outer diameter of 8 inches (outer periphery having a radius R1 of 101.6 mm), rigidity of a core 8 having an outer diameter of 10 inches (outer periphery having a radius R1 of 127 mm), and rigidity of a core 8 having an outer diameter of 12 inches (outer periphery having a radius R1 of 152.4 mm) are plotted.

A curve C31 is an approximation curve that indicates how rigidity of the core 8 having an outer diameter of 6 inches varies with varying wall thickness ratio (T1/T3) under conditions where the core 8 has a constant weight. A curve C32 is an approximation curve that indicates how rigidity of the core 8 having an outer diameter of 8 inches varies with varying wall thickness ratio (T1/T3) under conditions where the core 8 has a constant weight. A curve C33 is an approximation curve that indicates how rigidity of the core 8 having an outer diameter of 10 inches varies with varying wall thickness ratio (T1/T3) under conditions where the core 8 has a constant weight. A curve C34 is an approximation curve that indicates how rigidity of the core 8 having an outer diameter of 12 inches varies with varying wall thickness ratio (T1/T3) under conditions where the core 8 has a constant weight.

As illustrated in FIG. 11, for all of the curves C31 to C34, the wall thickness ratio (T1/T3) between the outer peripheral part 81 and a corresponding one of the ribs 83 at a maximum point of rigidity of the core 8 is not less than 0.5 and not more than 5 ($0.5 \leq T1/T3 \leq 5$). That is, in order to improve rigidity of the core 8 under conditions where the core 8 has a constant weight, it is preferable that the wall thickness ratio (T1/T3) between the outer peripheral part 81 and a corresponding one of the ribs 83 be not less than 0.5 and not more than 5.

More specifically, in a case where the core 8 has an outer diameter of less than 10 inches (having the outer diameter different from the inner diameter by less than 179 mm), e.g. has an outer diameter of 6 inches to 8 inches (having the outer diameter different from the inner diameter by not less than 77 mm and not more than 128.2 mm), it is preferable that the wall thickness ratio (T1/T3) be not less than 0.5 and not more than 1.4. Further, in a case where the core 8 has an outer diameter of 10 inches to 12 inches (having the outer diameter different from the inner diameter by not less than 179 mm and not more than 229.8 mm), it is preferable that the wall thickness ratio (T1/T3) be not less than 1.8 and not more than 5.

This makes it possible to improve rigidity of the core 8, without increasing the weight of the core 8.

Embodiment 4

Figure 12:
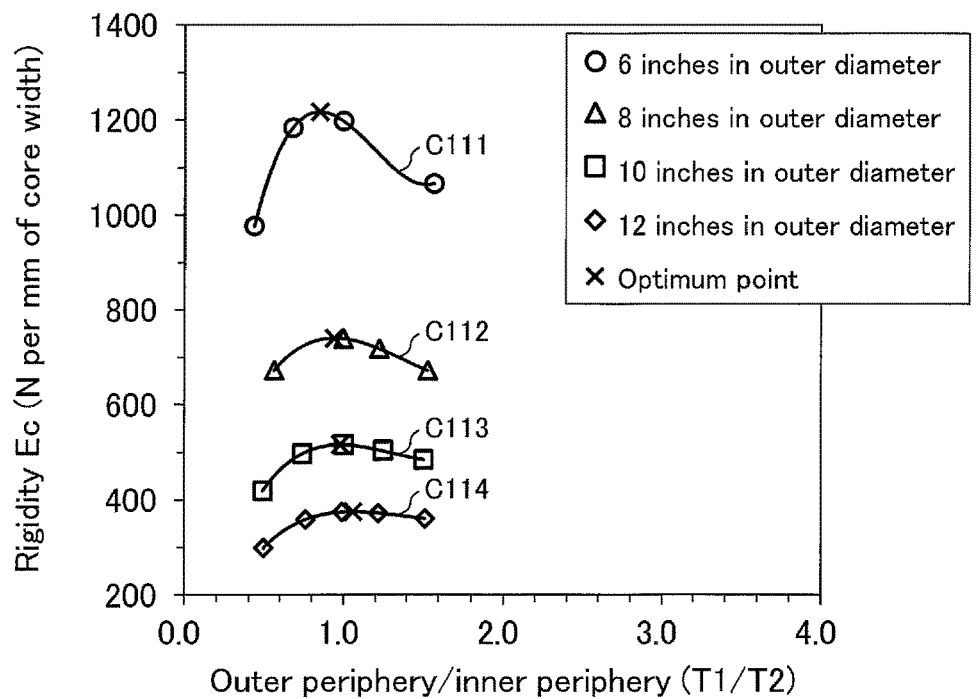
FIG. 12 is a graph showing a relationship between a wall thickness ratio between an outer peripheral part of a core including 10 ribs and an inner peripheral part of the core and rigidity of the core.
Figure 13:
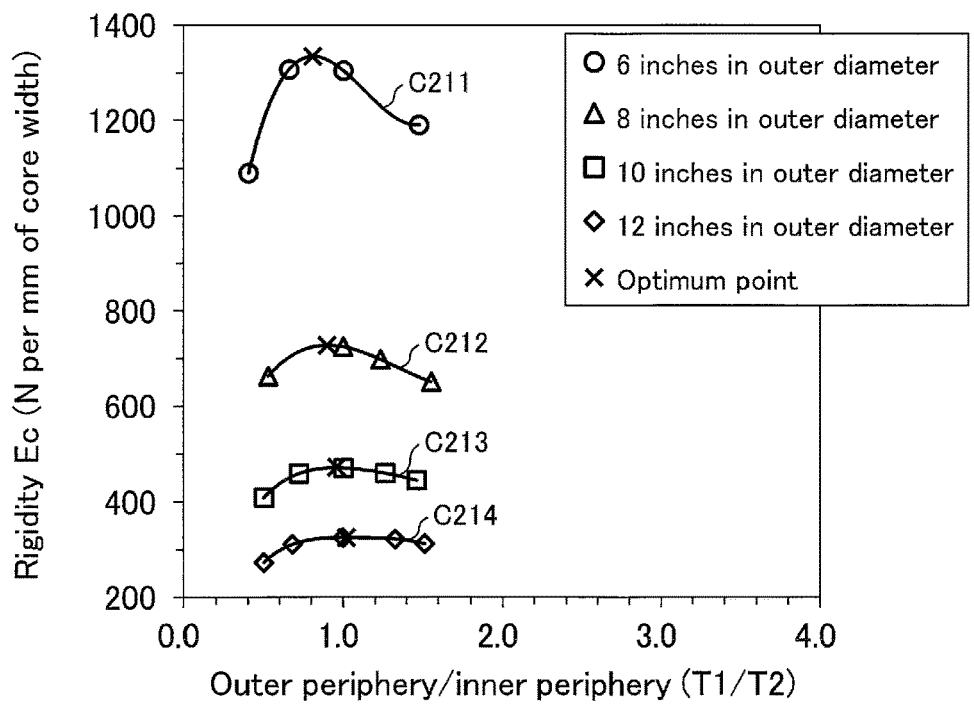
FIG. 13 is a graph showing a relationship between a wall thickness ratio between an outer peripheral part of a core including 12 ribs and an inner peripheral part of the core and rigidity of the core.
Figure 14:
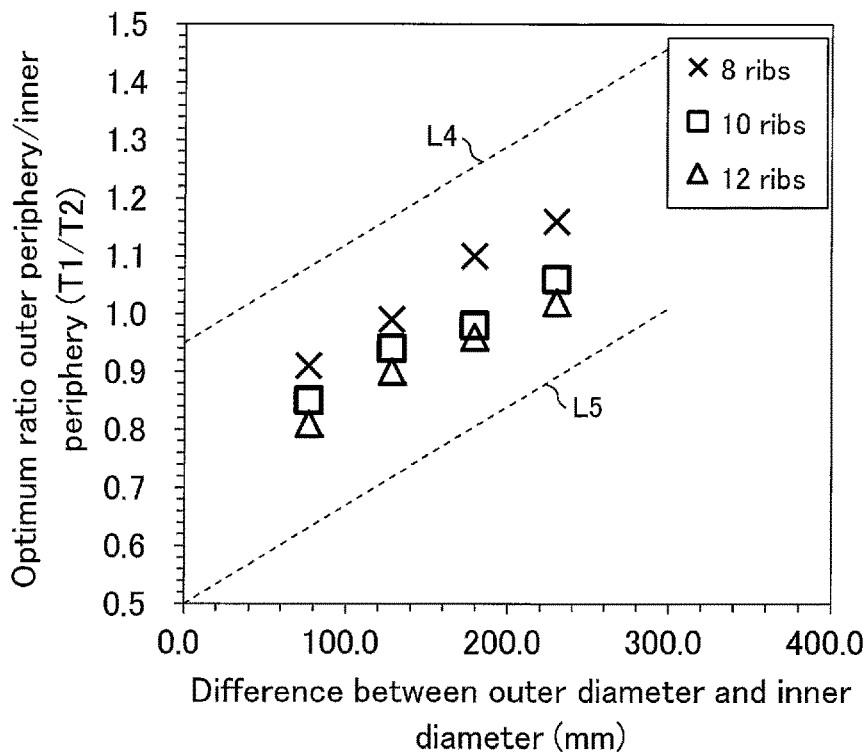
FIG. 14 is a graph showing a relationship between a difference between an outer diameter of a core and an inner diameter of the core and an optimum wall thickness ratio which allows rigidity of the core to reach a maximum.

The following description will discuss another embodiment of the present invention with reference to FIGS. 12-14. Note that, for convenience of description, any member having a function identical to that of a member discussed in the foregoing embodiment will be given an identical reference sign, and a description thereof will be omitted.

In the present embodiment, a description will be made as to a relationship between (i) a difference between an outer diameter and an inner diameter of a core and (ii) an optimal wall thickness ratio, in a case where the number of ribs included in the core is changed.

FIG. 12 is a graph showing a relationship between a wall thickness ratio between an outer peripheral part of a core including 10 ribs and an inner peripheral part of the core and rigidity of the core. FIG. 13 is a graph showing a relationship between a wall thickness ratio between an outer peripheral part of a core including 12 ribs and an inner peripheral part of the core and rigidity of the core. In the graph in each of FIGS. 12 and 13, a horizontal axis represents a ratio (T1/T2) between a wall thickness T1 (mm) of the outer peripheral part 81 and a wall thickness T2 (mm) of the inner peripheral part 82, and a vertical axis represents rigidity of the core 8.

On the graph in FIG. 12, for cores 8 each including 10 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted. On the graph in FIG. 13, for cores 8 each including 12 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted.

Curves C111 and C211 are each an approximation curve that indicates how rigidity of the core 8 having an outer diameter of 6 inches varies with varying wall thickness ratio (T1/T2) under conditions where the core 8 has a constant weight. Curves C112 and C212 are each an approximation curve that indicates how rigidity of the core 8 having an outer diameter of 8 inches varies with varying wall thickness ratio (T1/T2) under conditions where the core 8 has a constant weight. Curves C113 and C213 are each an approximation curve that indicates how rigidity of the core 8 having an outer diameter of 10 inches varies with varying wall thickness ratio (T1/T2) under conditions where the core 8 has a constant weight. Curves C114 and C214 are each an approximation curve that indicates how rigidity of the core 8 having an outer diameter of 12 inches varies with varying wall thickness ratio (T1/T2) under conditions where the core 8 has a constant weight.

Further, a sign X on the curves C111 to C114 and C211 to C214 indicates a maximum point on each of the curves C111 to C114 and C211 to C214. The maximum point indicates (i) an optimum wall thickness ratio that maximizes rigidity of the core 8 under conditions where the core 8 has a constant weight and (ii) rigidity obtained at that optimum wall thickness ratio.

FIG. 14 is a graph showing a relationship between a difference between an outer diameter of a core and an inner diameter of the core and an optimum wall thickness ratio which allows rigidity of the core to reach a maximum. In FIG. 14, a horizontal axis represents a difference between the outer diameter of the core 8 and the inner diameter of the core 8, and a vertical axis represents a wall thickness ratio (T1/T2) between the outer peripheral part 81 of the core 8 and the inner peripheral part 82 of the core 8.

In the graph in FIG. 14, signs X are plotted to indicate optimum wall thickness ratios (T1'/T2') at which rigidity of the cores 8 including 8 ribs and having outer diameters of 6 inches, 8 inches, 10 inches, and 12 inches, respectively, reach a maximum. The signs X in the graph in FIG. 14 correspond to the signs X in the graph in FIG. 9 described in Embodiment 1 above. Square signs are plotted to indicate optimum wall thickness ratios (T1'/T2') at which rigidity of the cores 8 including 10 ribs and having outer diameters of 6 inches, 8 inches, 10 inches, and 12 inches, respectively, reach a maximum. Triangular signs are plotted to indicate optimum wall thickness ratios (T1'/T2') at which rigidity of the cores 8 including 12 ribs and having outer diameters of 6 inches, 8 inches, 10 inches, and 12 inches, respectively, reach a maximum.

As shown in the graph in FIG. 14, in the cases of each of the cores including 10 ribs and each of the cores including 12 ribs as well as the cases of each of the cores including 8 ribs, the optimum wall thickness ratio (T1'/T2') at which rigidity of the core 8 reach a maximum is proportional to a difference D between the outer diameter of the core 8 and the inner diameter of the core 8. This shows that in cases where the core 8 includes approximately 8 ribs (e.g. 6-12 ribs), the optimum wall thickness ratio (T1'/T2') at which rigidity of the core 8 reach a maximum is proportional to a difference D between the outer diameter of the core 8 and the inner diameter of the core 8.

That is, assuming that a difference between the outer diameter and the inner diameter is denoted as D (mm), it is preferable that the difference D between the outer diameter and the inner diameter and the wall thickness ratio (T1/T2) between the outer peripheral part 81 and the inner peripheral part 82 be so designed as to satisfy the following inequality:

$$D \times 0.0017 + 0.50 < T1/T2 < D \times 0.0017 + 0.95.$$

In the graph in FIG. 14, a line L4 is a line that connects points obtained by incrementing the points on the approximation line L1 in FIG. 9 by 0.17, and a line L5 is a line that connects points obtained by decrementing the points on the approximation line L1 by 0.28. It is preferable that dimensions of the core 8 be determined so that a value of the wall thickness ratio (T1/T2) falls within a range extending from the line L4 to the line L5.

This makes it possible to improve rigidity of the core 8, without increasing the weight of the core 8.

Embodiment 5

Figure 15:
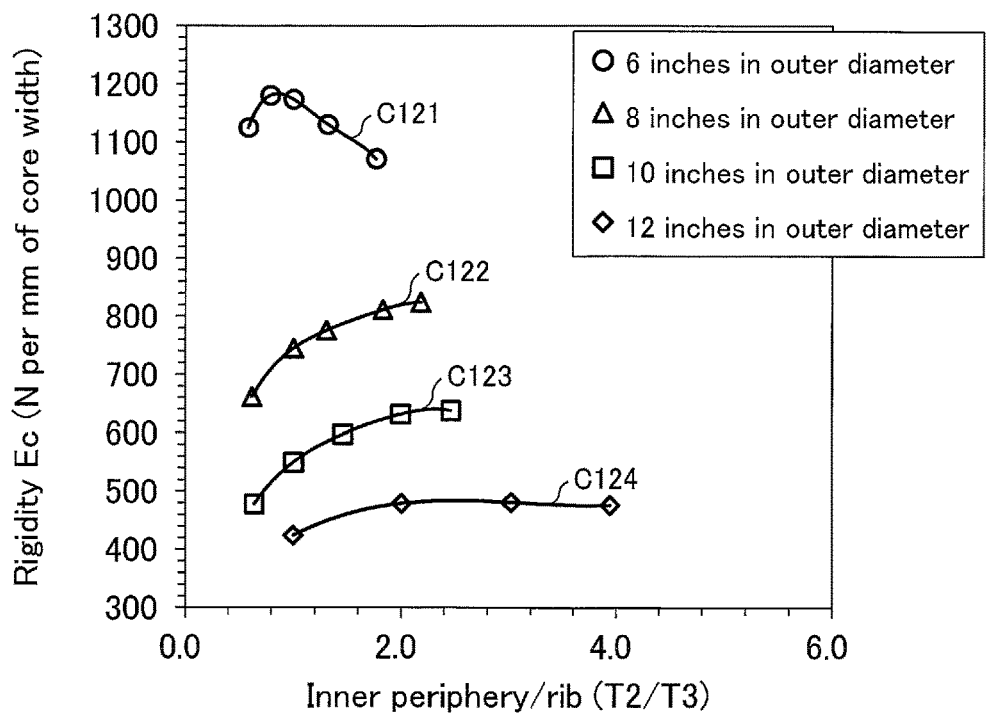
FIG. 15 is a graph showing a relationship between a wall thickness ratio between an inner peripheral part of a core including 10 ribs and a corresponding one of ribs of the core and rigidity of the core.
Figure 16:
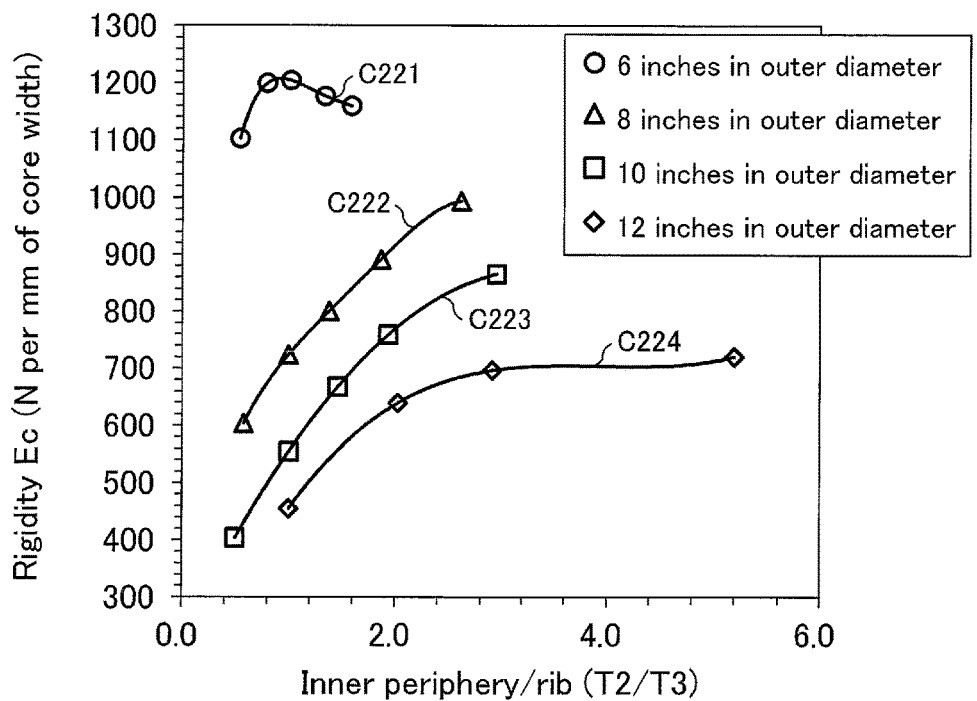
FIG. 16 is a graph showing a relationship between a wall thickness ratio between an inner peripheral part of a core including 12 ribs and a corresponding one of ribs of the core and rigidity of the core.

The following description will discuss another embodiment of the present invention with reference to FIGS. 15 and 16. Note that, for convenience of description, any member having a function identical to that of a member discussed in the foregoing embodiment will be given an identical reference sign, and a description thereof will be omitted.

In the present embodiment, a description will be made as to a relationship between (i) a wall thickness ratio between an inner peripheral part of a core and a corresponding one of ribs of the core and (ii) rigidity of the core, in a case where the number of ribs included in the core is changed.

FIG. 15 is a graph showing a relationship between a wall thickness ratio between an inner peripheral part of a core including 10 ribs and a corresponding one of ribs of the core and rigidity of the core. FIG. 16 is a graph showing a relationship between a wall thickness ratio between an inner peripheral part of a core including 12 ribs and a corresponding one of ribs of the core and rigidity of the core. In the graph in each of FIGS. 15 and 16, a horizontal axis represents a ratio (T2/T3) between a wall thickness T2 (mm) of the inner peripheral part 82 and a wall thickness T3 (mm) of a corresponding one of ribs 83, and a vertical axis represents rigidity of the core 8.

On the graph in FIG. 15, for cores 8 each including 10 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted. On the graph in FIG. 16, for cores 8 each including 12 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted.

Curves C121 and 221 are each an approximation curve that indicates how rigidity of the core 8 having an outer diameter of 6 inches varies with varying wall thickness ratio (T2/T3) under conditions where the core 8 has a constant weight. Curves C122 and C222 are each an approximation curve that indicates how rigidity of the core 8 having an outer diameter of 8 inches varies with varying wall thickness ratio (T2/T3) under conditions where the core 8 has a constant weight. Curves C123 and C223 are each an approximation curve that indicates how rigidity of the core 8 having an outer diameter of 10 inches varies with varying wall thickness ratio (T2/T3) under conditions where the core 8 has a constant weight. Curves C124 and C224 are each an approximation curve that indicates how rigidity of the core 8 having an outer diameter of 12 inches varies with varying wall thickness ratio (T2/T3) under conditions where the core 8 has a constant weight.

As illustrated in FIG. 15, for all of the curves C121 to C124 of the cores 8 each including 10 ribs, the wall thickness ratio (T2/T3) between the inner peripheral part 82 and a corresponding one of the ribs 83 at a maximum point of rigidity of the core 8 is not less than 0.5 (0.5≤T2/T3). That is, in order to improve rigidity of the core 8 under conditions where the core 8 has a constant weight, it is preferable that the wall thickness ratio (T2/T3) between the inner peripheral part 82 and a corresponding one of the ribs 83 be not less than 0.5. More specifically, in a case where the core 8 has an outer diameter of 6 inches (having the outer diameter different from the inner diameter by 77 mm), it is preferable that the wall thickness ratio (T2/T3) be not less than 0.5 and not more than 1.1. Further, in a case where the core 8 has an outer diameter of 8 inches to 12 inches (having the outer diameter different from the inner diameter by not less than 128.2 mm and not more than 229.8 mm), it is preferable that the wall thickness ratio (T2/T3) be not less than 0.8.

As illustrated in FIG. 16, for all of the curves C221 to C224 of the cores 8 each including 12 ribs, the wall thickness ratio (T2/T3) between the inner peripheral part 82 and a corresponding one of the ribs 83 at a maximum point of rigidity of the core 8 is not less than 0.5 (0.5≤T2/T3). That is, in order to improve rigidity of the core 8 under conditions where the core 8 has a constant weight, it is preferable that the wall thickness ratio (T2/T3) between the inner peripheral part 82 and a corresponding one of the ribs 83 be not less than 0.5. More specifically, in a case where the core 8 has an outer diameter of 6 inches (having the outer diameter different from the inner diameter by 77 mm), it is preferable that the wall thickness ratio (T2/T3) be not less than 0.5 and not more than 1.1. Further, in a case where the core 8 has an outer diameter of 8 inches to 12 inches (having the outer diameter different from the inner diameter by not less than 128.2 mm and not more than 229.8 mm), it is preferable that the wall thickness ratio (T2/T3) be not less than 0.8.

This makes it possible to improve rigidity of the core 8, without increasing the weight of the core 8.

Embodiment 61

Figure 17:
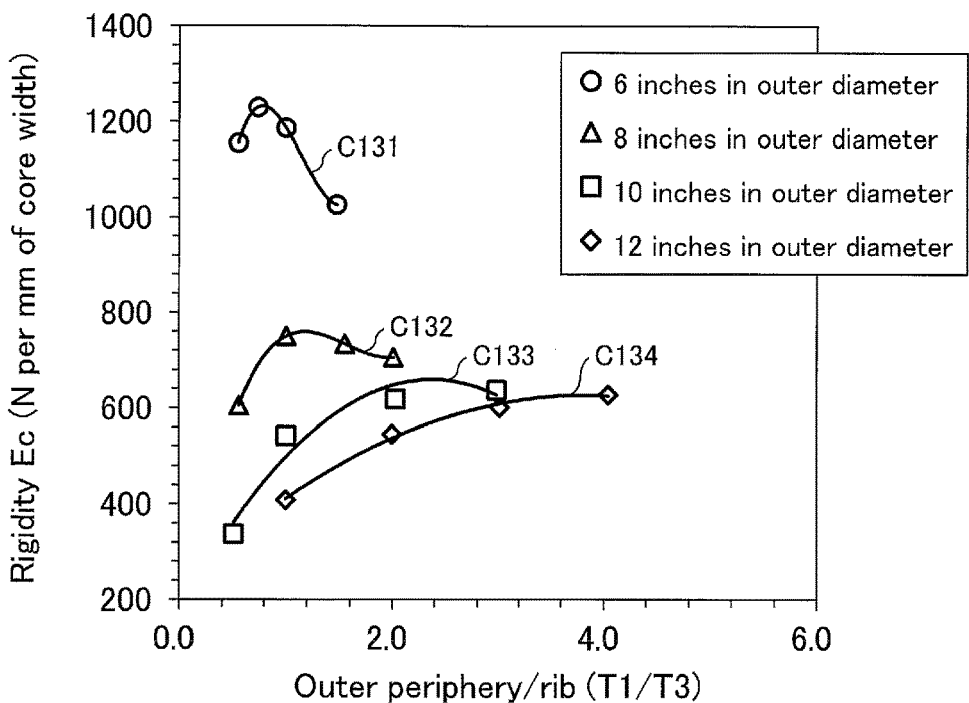
FIG. 17 is a graph showing a relationship between a wall thickness ratio between an outer peripheral part of a core including 10 ribs and a corresponding one of ribs of the core and rigidity of the core.
Figure 18:
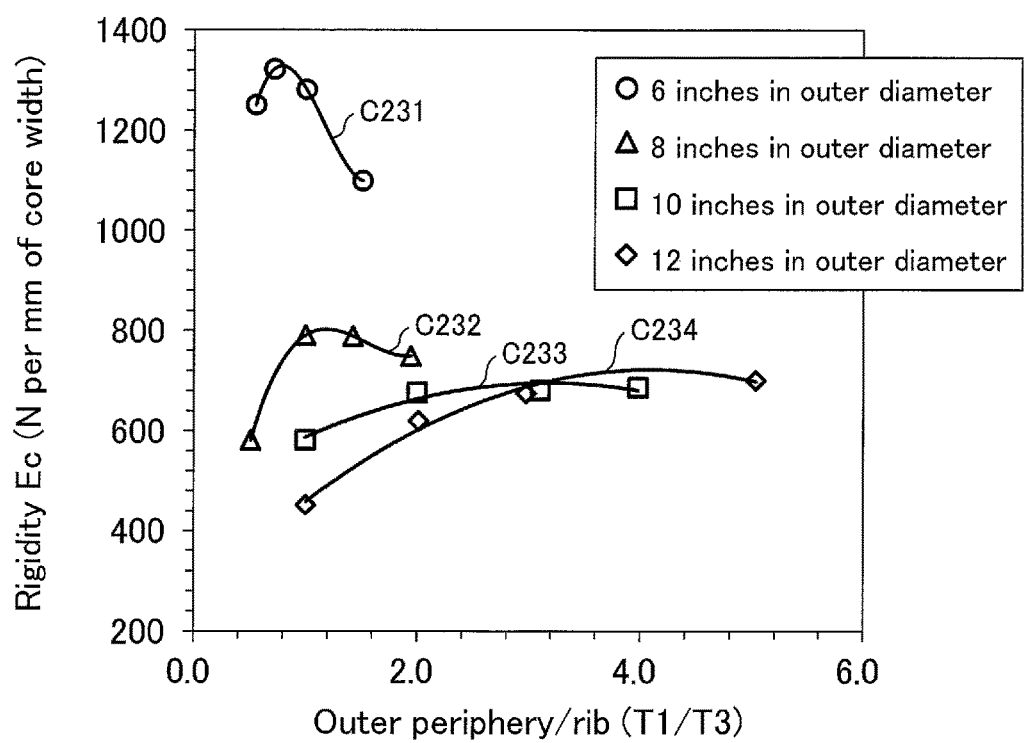
FIG. 18 is a graph showing a relationship between a wall thickness ratio between an outer peripheral part of a core including 12 ribs and a corresponding one of ribs of the core and rigidity of the core.

The following description will discuss still another embodiment of the present invention with reference to FIGS. 17 and 18. Note that, for convenience of description, any member having a function identical to that of a member discussed in the foregoing embodiment will be given an identical reference sign, and a description thereof will be omitted.

In the present embodiment, a description will be made as to a relationship between (i) a wall thickness ratio between an outer peripheral part of a core and a corresponding one of ribs of the core and (ii) rigidity of the core, in a case where the number of ribs included in the core is changed.

FIG. 17 is a graph showing a relationship between a wall thickness ratio between an outer peripheral part of a core including 10 ribs and a corresponding one of ribs of the core and rigidity of the core. FIG. 18 is a graph showing a relationship between a wall thickness ratio between an outer peripheral part of a core including 12 ribs and a corresponding one of ribs of the core and rigidity of the core. In the graph in each of FIGS. 17 and 18, a horizontal axis represents a ratio (T1/T3) between a wall thickness T1 (mm) of the outer peripheral part 81 and a wall thickness T3 (mm) of a corresponding one of ribs 83, and a vertical axis represents rigidity of the core 8.

On the graph in FIG. 17, for cores 8 each including 10 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted. On the graph in FIG. 18, for cores 8 each including 12 ribs 83 provided at equal intervals along a circumference of the core, rigidity of a core 8 having an outer diameter of 6 inches, rigidity of a core 8 having an outer diameter of 8 inches, rigidity of a core 8 having an outer diameter of 10 inches, and rigidity of a core 8 having an outer diameter of 12 inches are plotted.

Curves C131 and C231 are each an approximation curve that indicates how rigidity of the core 8 having an outer diameter of 6 inches varies with varying wall thickness ratio (T1/T3) under conditions where the core 8 has a constant weight. Curves C132 and C232 are each an approximation curve that indicates how rigidity of the core 8 having an outer diameter of 8 inches varies with varying wall thickness ratio (T1/T3) under conditions where the core 8 has a constant weight, Curves C133 and C233 are each an approximation curve that indicates how rigidity of the core 8 having an outer diameter of 10 inches varies with varying wall thickness ratio (T1/T3) under conditions where the core 8 has a constant weight. Curves C134 and 234 are each an approximation curve that indicates how rigidity of the core 8 having an outer diameter of 12 inches varies with varying wall thickness ratio (T1/T3) under conditions where the core 8 has a constant weight.

As illustrated in FIG. 17, for all of the curves C131 to C134 of the cores 8 each including 10 ribs, the wall thickness ratio (T1/T3) between the outer peripheral part 81 and a corresponding one of the ribs 83 at a maximum point of rigidity of the core 8 is not less than 0.5 and not more than 5 ($0.5 \leq T1/T3 \leq 5$). That is, in order to improve rigidity of the core 8 under conditions where the core 8 has a constant weight, it is preferable that the wall thickness ratio (T1/T3) between the outer peripheral part 81 and a corresponding one of the ribs 83 be not less than 0.5 and not more than 5. More specifically, in a case where the core 8 has an outer diameter of less than 10 inches (having the outer diameter different from the inner diameter by less than 179 mm), e.g. has an outer diameter of 6 inches to 8 inches (having the outer diameter different from the inner diameter by not less than 77 mm and not more than 128.2 mm), it is preferable that the wall thickness ratio (T1/T3) be not less than 0.5 and not more than 1.4. Further, in a case where the core 8 has an outer diameter of 10 inches to 12 inches (having the outer diameter different from the inner diameter by not less than 179 mm and not more than 229.8 mm), it is preferable that the wall thickness ratio (T1/T3) be not less than 1.8 and not more than 5.

As illustrated in FIG. 18, for all of the curves C231 to C234 of the cores 8 each including 12 ribs, the wall thickness ratio (T1/T3) between the outer peripheral part 81 and a corresponding one of the ribs 83 at a maximum point of rigidity of the core 8 is not less than 0.5 and not more than 5 ($0.5 \leq T1/T3 \leq 5$). That is, in order to improve rigidity of the core 8 under conditions where the core 8 has a constant weight, it is preferable that the wall thickness ratio (T1/T3) between the outer peripheral part 81 and a corresponding one of the ribs 83 be not less than 0.5 and not more than 5. More specifically, in a case where the core 8 has an outer diameter of less than 10 inches (having the outer diameter different from the inner diameter by less than 179 mm), e.g. has an outer diameter of 6 inches to 8 inches (having the outer diameter different from the inner diameter by not less than 77 mm and not more than 128.2 mm), it is preferable that the wall thickness ratio (T1/T3) be not less than 0.5 and not more than 1.4. Further, in a case where the core 8 has an outer diameter of 10 inches to 12 inches (having the outer diameter different from the inner diameter by not less than 179 mm and not more than 229.8 mm), it is preferable that the wall thickness ratio (T1/T3) be not less than 1.8 and not more than 5.

This makes it possible to improve rigidity of the core 8, without increasing the weight of the core 8.

[Recap]

A film roll in accordance with an embodiment of the present invention is a film roll including: a cylindrical core; and a film wound around an outer peripheral surface of the core, the core including: a ring-shaped outer peripheral part defining an outer diameter of the core; a ring-shaped inner peripheral part, provided inside the outer peripheral part, defining an inner diameter of the core; and a plurality of ribs which extend between the outer peripheral part and the inner peripheral part in a direction of a radius of the core so as to connect the outer peripheral part and the inner peripheral part, the core satisfying the following inequality: $D \times 0.0017 + 0.50 < T1/T2 < D \times 0.0017 + 0.95$, wherein D (mm) denotes a difference between the outer diameter of the core and the inner diameter of the core, T1 (mm) denotes a thickness of the outer peripheral part, and T2 (mm) denotes a thickness of the inner peripheral part.

The above arrangement enables a thickness ratio of the outer peripheral part and the inner peripheral part to take a preferable value for increasing rigidity of the core. This makes it possible to provide a film roll that includes a core having improved rigidity without increasing a weight and cost of the core.

Further it is preferable that the plurality of ribs are provided at equal intervals along a circumference of the core, and the core satisfies the following inequality: $0.5 \leq T2/T3 \leq 2.3$, wherein T3 (mm) is a thickness of a corresponding one of the ribs.

The above arrangement enables a thickness ratio of the inner peripheral part and a corresponding one of the ribs to take a preferable value for increasing rigidity of the core. This makes it possible to provide a film roll that includes a core having improved rigidity without increasing a weight and cost of the core.

Still further it is preferable that the difference, D (mm), between the outer diameter of the core and the inner diameter of the core is not less than 128.2 mm and not more than 229.8 mm, and the core satisfies the following inequality: $0.8 \leq T2/T3 \leq 2.3$.

The above arrangement enables a core having an outer diameter different from an inner diameter by not less than 128.2 mm and not more than 229.8 mm to have a preferable value of a thickness ratio of the inner peripheral part and a corresponding one of the ribs, the preferable value allowing increase in rigidity of the core.

Yet further, it is preferable that the plurality of ribs are provided at equal intervals along a circumference of the core, and the core satisfies the following inequality: $0.5 \leq T1/T3 \leq 5$, wherein T3 (mm) is a thickness of a corresponding one of the ribs.

The above arrangement enables a thickness ratio of the outer peripheral part and a corresponding one of the ribs to take a preferable value for increasing rigidity of the core. This makes it possible to provide a film roll that includes a core having improved rigidity without increasing a weight and cost of the core.

Further, it is preferable that the difference, D (mm), between the outer diameter of the core and the inner diameter of the core is not less than 77 mm and less than than 179 mm, and the core satisfies the following inequality: $0.5 \leq T1/T3 \leq 1.4$.

The above arrangement enables a core having an outer diameter different from an inner diameter by not less than 77 mm and not more than 128.2 mm to have a preferable value of a thickness ratio of the inner peripheral part and a corresponding one of the ribs, the preferable value allowing increase in rigidity of the core.

Still further, it is preferable that the difference, D (mm), between the outer diameter of the core and the inner diameter of the core is not less than 179 mm and not more than 229.8 mm, and the core satisfies the following inequality: $1.8 \leq T1/T3 \leq 5$.

The above arrangement enables a core having an outer diameter different from an inner diameter by not less than 179 mm and not more than 229.8 mm to have a preferable value of a thickness ratio of the outer peripheral part and a corresponding one of the ribs, the preferable value allowing increase in rigidity of the core.

Yet further, it is preferable that the inner diameter of the core is 3 inches, and the outer diameter of the core is not less than 6 inches and not more than 12 inches.

A method for producing a film roll in accordance with an embodiment of the present invention is a method for producing a film roll, the film roll including: a cylindrical core; and a film wound around an outer peripheral surface of the core, the method including the step of: winding the film around the outer peripheral surface of the core, the core including: a ring-shaped outer peripheral part defining an outer diameter of the core; a ring-shaped inner peripheral part, provided inside the outer peripheral part, defining an inner diameter of the core; and a plurality of ribs which extend between the outer peripheral part and the inner peripheral part in a direction of a radius of the core so as to connect the outer peripheral part and the inner peripheral part, the core satisfying the following inequality: $D \times 0.0017 + 0.50 < T1/T2 < D \times 0.0017 + 0.95$, wherein D (mm) denotes a difference between the outer diameter of the core and the inner diameter of the core, T1 (mm) denotes a thickness of the outer peripheral part, and T2 (mm) denotes a thickness of the inner peripheral part.

The above production method enables a thickness ratio of the outer peripheral part and the inner peripheral part to take a preferable value for increasing rigidity of the core. This makes it possible to produce a film roll that includes a core having improved rigidity without increasing a weight and cost of the core.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention.

REFERENCE SIGNS LIST

10 Heat-resistant separator roll
12a Heat-resistant separator
81 Outer peripheral part
82 Inner peripheral part
83 Rib

The invention claimed is:

1. A film roll comprising:
   a cylindrical core; and
   a film wound around an outer peripheral surface of the core,
   the core including:
   a ring-shaped outer peripheral part defining an outer diameter of the core;
   a ring-shaped inner peripheral part, provided inside the outer peripheral part, defining an inner diameter of the core; and
   a plurality of ribs which extend between the outer peripheral part and the inner peripheral part in a direction of a radius of the core so as to connect the outer peripheral part and the inner peripheral part,
   the ring-shaped inner peripheral part and the ring-shaped outer peripheral part each being substantially uniform in thickness,
   the core satisfying the following inequality:

$D \times 0.0017 + 0.63 < T1/T2 < D \times 0.0017 + 0.93$, wherein D (mm) denotes a difference between the outer diameter of the core and the inner diameter of the core, T1 (mm) denotes a thickness of the outer peripheral part, and T2 (mm) denotes a thickness of the inner peripheral part.

2. The film roll according to claim 1, wherein
   the plurality of ribs comprises eight ribs provided at equal intervals along a circumference of the core, and
   the core satisfies the following inequality:

$0.5 \leq T2/T3 \leq 2.3$, wherein T3 (mm) is a thickness of a corresponding one of the ribs.

3. The film roll according to claim 2, wherein
   the difference, D (mm), between the outer diameter of the core and the inner diameter of the core is not less than 128.2 mm and not more than 229.8 mm, and
   the core satisfies the following inequality:

$0.8 \leq T2/T3 \leq 2.3$.

4. The film roll according to claim 1, wherein
   the plurality of ribs comprises eight ribs provided at equal intervals along a circumference of the core, and
   the core satisfies the following inequality:

$0.5 \leq T1/T3 \leq 5$, wherein T3 (mm) is a thickness of a corresponding one of the ribs.

5. The film roll according to claim 4, wherein
the difference, D (mm), between the outer diameter of the core and the inner diameter of the core is not less than 77 mm and not more than 128.2 mm, and
the core satisfies the following inequality:

$$0.5 \leq T1/T3 \leq 1.4.$$

6. The film roll according to claim 4, wherein
the difference, D (mm), between the outer diameter of the core and the inner diameter of the core is not less than 179 mm and not more than 229.8 mm, and
the core satisfies the following inequality:

$$1.8 \leq T1/T3 \leq 5.$$

7. The film roll according to claim 1, wherein
the inner diameter of the core is 3 inches, and the outer diameter of the core is not less than 6 inches and not more than 12 inches.

8. A method for producing a film roll, the film roll comprising: a cylindrical core; and a film wound around an outer peripheral surface of the core,
the method comprising the step of:
winding the film around the outer peripheral surface of the core, the core including: a ring-shaped outer peripheral part defining an outer diameter of the core; a ring-shaped inner peripheral part, provided inside the outer peripheral part, defining an inner diameter of the core; and a plurality of ribs which extend between the outer peripheral part and the inner peripheral part in a direction of a radius of the core so as to connect the outer peripheral part and the inner peripheral part,
the ring-shaped inner peripheral part and the ring-shaped outer peripheral part each being substantially uniform in thickness,
the core satisfying the following inequality:

$$D \times 0.0017 + 0.63 < T1/T2 < D \times 0.0017 + 0.93,$$

wherein D (mm) denotes a difference between the outer diameter of the core and the inner diameter of the core, T1 (mm) denotes a thickness of the outer peripheral part, and T2 (mm) denotes a thickness of the inner peripheral part.

* * * * *